US012460028B2

United States Patent
Al-haj Ali et al.

(10) Patent No.: US 12,460,028 B2
(45) Date of Patent: Nov. 4, 2025

(54) PROCESS FOR THE POLYMERIZATION OF OLEFINS IN SOLUTION WITH CONTROLLED ACTIVITY OF CATALYST IN REACTOR OUTLET STREAM

(71) Applicant: Borealis AG, Vienna (AT)

(72) Inventors: Mohammad Al-haj Ali, Porvoo (FI);
Noureddine Ajellal, Porvoo (FI);
Charlotta Weber, Stockholm (SE)

(73) Assignee: BOREALIS AG, Vienna (AT)

( * ) Notice: Subject to any disclaimer, the term of this patent is extended or adjusted under 35 U.S.C. 154(b) by 655 days.

(21) Appl. No.: 17/790,541

(22) PCT Filed: Dec. 30, 2020

(86) PCT No.: PCT/EP2020/088021
§ 371 (c)(1),
(2) Date: Jul. 1, 2022

(87) PCT Pub. No.: WO2021/136804
PCT Pub. Date: Jul. 8, 2021

(65) Prior Publication Data
US 2023/0067585 A1    Mar. 2, 2023

(30) Foreign Application Priority Data
Jan. 2, 2020   (EP) ..................... 20150108

(51) Int. Cl.
*C08F 210/16*   (2006.01)
(52) U.S. Cl.
CPC .................. *C08F 210/16* (2013.01)
(58) Field of Classification Search
CPC ................. C08F 210/16; C08F 2410/08
See application file for complete search history.

(56) References Cited

U.S. PATENT DOCUMENTS

| | | | | |
|---|---|---|---|---|
| 4,430,488 A | * | 2/1984 | Zboril | C08F 6/02 524/400 |
| 4,777,229 A | * | 10/1988 | Zboril | C08F 10/00 526/348.6 |
| 5,408,017 A | | 4/1995 | Turner et al. | |
| 8,809,220 B2 | * | 8/2014 | Jorgensen | C08F 10/02 526/113 |
| 9,062,138 B2 | | 6/2015 | Ker et al. | |
| 9,221,932 B2 | * | 12/2015 | Jorgensen | C08F 10/00 |
| 9,550,847 B2 | * | 1/2017 | Bell | C08F 210/16 |
| 9,963,529 B1 | * | 5/2018 | Kazemi | B01J 4/02 |
| 2003/0229188 A1 | | 12/2003 | Nagy et al. | |
| 2011/0160373 A1 | * | 6/2011 | Bernreitner | C08F 10/06 524/451 |

FOREIGN PATENT DOCUMENTS

| | | | | |
|---|---|---|---|---|
| CA | 2964563 A1 | * | 10/2018 | |
| CN | 1324370 A | | 11/2001 | |
| CN | 104656457 A | * | 5/2015 | |
| EP | 1129115 A1 | | 9/2001 | |
| EP | 1509554 A1 | | 3/2005 | |
| EP | 1748039 A1 | | 1/2007 | |
| EP | 2231779 A1 | | 9/2010 | |
| EP | 2268677 A2 | | 1/2011 | |
| JP | 2006152250 A | * | 6/2006 | |
| WO | 0024792 A1 | | 5/2000 | |
| WO | 2014058663 A1 | | 4/2014 | |
| WO | WO-2016063200 A1 | * | 4/2016 | ............. B29C 41/04 |
| WO | 2019162456 A1 | | 8/2019 | |

OTHER PUBLICATIONS

P.A. Charpentier et al Continuous Solution Poltmerization of Ethylene Using Catalyst System, Zirconecene Dichloride/Methylaluminoxane/Trimethylaluminum, Industrial & Engineering Chemistry Research vol. 36, No. 12. Dec. 1, 1997.
Johannes A.M. Awudza et al, The Commoner Effect in Ethylene/[Alpha]-Olefin Copolymerization Using Homogeneous and Silica-Supported Cp2ZrC12/Mao Catalyst Systems: Some Insights From the Kinetics of Polymerization, Active Center Studies, and Polymerization Temperature, Journal of Polymer Science, Part A Polymer Chemistry, vol. 46, No. 1.
Internation Search Report of Application PCT/EP2020/088021 dated Apr. 27, 2021.
Korean Office Action Application No. 10-2022-7023418 Dated: Sep. 11, 2024.
Mohammad Al-Haj Ali; Modeling and Control of Molecular Weight Distribution in a Liquid-Phase Polypropylene Reactor; pp. 1-344.
M.Q.K. Al Haj Ali; Modeling and control of molecularweight distribution in a liquid-phase polypropylene reactor; pp. 1-2; Jan. 26, 2006.
Edward P. Moore, Jr; Polypropylen Handbook; Hanser/Gardner Publications, pp. 80-81.
Substantive Examination Report of Saudi Arabian Application No. 522433183.

* cited by examiner

*Primary Examiner* — Rip A Lee
(74) *Attorney, Agent, or Firm* — Lippes Mathias LLP

(57) ABSTRACT

The present invention relates to a polymerisation process, comprising: a) supplying a feed containing ethylene and at least one alpha-olefin having 3 to 12 carbon atoms in a hydrocarbon solvent to a polymerisation reactor, b) contacting the feed of step a) in the reactor with a catalyst to form a reaction mixture containing an ethylene-alpha-olefin co-polymer, whereby the average residence time in the reactor is chosen to be between 0.5 and 30 minutes, c) withdrawing the reaction mixture from the polymerisation reactor as a reactor outlet stream which comprises the ethylene-alpha-olefin co-polymer, unreacted monomer, catalyst, and hydrocarbon solvent, and d) separating hydrocarbon solvent, monomer and comonomer from the reactor outlet stream and recycling it back to the polymerisation reactor without further purification steps, wherein in step c) no more than 5 wt. % of catalyst in an active state is leaving the reactor.

14 Claims, 3 Drawing Sheets

Figure 1:
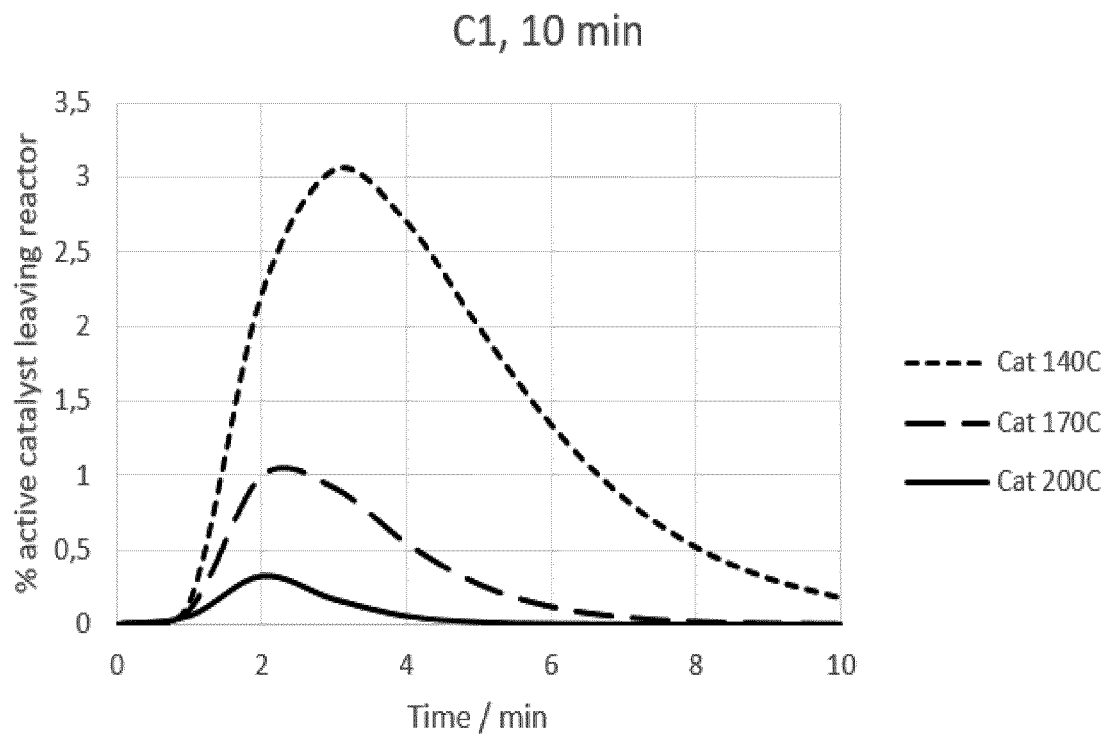

PROCESS FOR THE POLYMERIZATION OF OLEFINS IN SOLUTION WITH CONTROLLED ACTIVITY OF CATALYST IN REACTOR OUTLET STREAM

CROSS REFERENCE TO RELATED APPLICATIONS

This is a 371 of PCT Application No. PCT/EP2020/088021, filed Dec. 30, 2020, which claims the benefit of European Application No. 20150108.7, filed Jan. 2, 2020, the contents of which are incorporated herein in their entirety.

The present invention is concerned with a process for the polymerization of olefin monomers in solution in the presence of a polymerization catalyst wherein the catalyst leaving the reactor in the reactor outlet stream has a controlled activity.

In polyolefin production processes the catalyst has to be de-activated after the polymerization reaction. This is typically done downstream of the removal of the monomer from the produced polymer by adding a de-activation agent. In this manner, monomer can be recycled back to the reactor without that poisoning of the catalyst in the reactor by carrying over traces of de-activation agent occurs.

However, in solution polymerization this sequence is problematic because the initial low pressure separation as typically used in a solution polymerization sequence removes hydrogen, monomer(s), co-monomer(s) and solvent only imperfectly. Thus, the concentration of higher boiling components such as co-monomer(s) which remain in the mixture is significant and with the catalyst still being active, uncontrolled polymerization will occur. Moreover, also the residence time in the initial low pressure separation cannot be neglected in view of the rapid polymerization reaction in solution.

Thus, in solution polymerization, the de-activation of the polymerization catalyst usually precedes the removal of the monomer(s), co-monomer(s) and the like. Such sequence is inter alia described in US 2011/0172375 and WO 2009/126277. The de-activation of the polymerization catalyst is secured by the addition of a de-activation agent to the reactor outlet. However, addition of a de-activation agent to the reactor outlet stream may cause de-activation agent to be present in the recycling streams and hence contamination of the feed streams to the reactor.

Typical de-activation agents are water in the form of steam or in liquid form, or alcohols such as methanol or isopropanol. Use of methanol is described for example in US 2011/0172375. When using alcohols two further separation steps, i.e. a water-alcohol separation followed by a drying step, are necessary. In addition to that, the widespread use of isopropanol results in formation of hydrochloric acid, causing corrosion and also fouling problems. Instead of using a liquid de-activation agent a solid de-activation agent may be used. WO 2009/126277 discloses the use of sodium or calcium stearate. However, use of solid de-activation agents requires the presence of further equipment for its removal, such as a further column, dryer bed, stripper or the like.

It is the object of the present invention to provide a process for the polymerization of olefin monomers in solution which allows for a recycling of the monomers, which are separated from the polymeric product downstream of the polymerization reactor, back to the reactor minimizing or even avoiding completely that trace amounts of a de-activation agent are "co-recycled" to the reactor in a simple, effective and economical manner.

The present invention is based on the finding that this object can be achieved by optimizing and adjusting the residence time of the catalyst in the reactor to ensure that only a minimum fraction of active catalyst leaves the reactor which, in turn, obviates the need to actively de-activate the catalyst in the reactor outlet stream.

The present invention therefore provides a polymerisation process, comprising:
a) supplying a feed containing ethylene and at least one alpha-olefin having 3 to 12 carbon atoms in a hydrocarbon solvent to a polymerisation reactor,
b) contacting the feed of step a) in the reactor with a catalyst to form a reaction mixture containing an ethylene-alpha-olefin co-polymer, whereby the average residence time in the reactor is chosen to be between 0.5 and 30 minutes,
c) withdrawing the reaction mixture from the polymerisation reactor as a reactor outlet stream which comprises the ethylene-alpha-olefin co-polymer, unreacted monomer and comonomer, catalyst, and hydrocarbon solvent, and
d) separating hydrocarbon solvent, monomer and comonomer from the reactor outlet stream and recycling it back to the polymerisation reactor without further purification steps, wherein in step c) no more than 5 wt. % of catalyst in an active state is leaving the reactor.

Using the process of the invention a number of issues which may appear downstream, like uncontrolled reactions and fouling of equipment, can be avoided without that the catalyst needs to be actively de-activated after leaving the reactor, for example by adding a de-activation agent to the reactor outlet stream.

The term "reactor outlet stream" designates the stream of reaction mixture directly withdrawn from reactor, comprising ethylene-alpha-olefin co-polymer, unreacted monomer and comonomer, catalyst, and hydrocarbon solvent, which has not been subjected to any further treatment steps.

The "average residence time" as is understood by the skilled person is the average residence time of reactor's contents including catalyst.

A polymerization process such as the process of the invention which is carried out in the presence of a solvent is designated herein also as "solution polymerization process".

In high temperature solution olefin polymerization, in particular in ethylene-alpha-olefin co-polymerization, the catalyst must fulfil a set of very strict requirements. For example, catalyst molecular weight capability, catalyst thermal stability and reactivity for higher co-monomers (co-monomer incorporation), must be so that co-polymers with density as low as ~0.850 $g/cm^3$ and a MI as low as ~0.1 dg/min can be produced with high productivity.

Generally, different catalysts have different active life span that can be described by the kinetics of such catalyst and depend on process conditions/temperature.

According to the invention, the polymerization conditions in the reactor are chosen in such a way to ensure that, at any time, only a minimum fraction of active catalyst leaves the reactor, i.e. that at most 5 wt. % of the catalyst leaving the reactor is still in an active state.

This can, for example, be achieved by an adaption of the reaction conditions such as control of the average residence time in the reactor considering the reaction temperature, as the fraction of catalyst which is inactivated per time is dependent on the reaction temperature.

In a preferred embodiment, in order to effect that in step c) no more than 5 wt. % of catalyst in an active state is leaving the reactor, the average residence time in step b) is adjusted.

For this purpose, the average residence time in the reactor is adjusted based on, for example, the kinetic profile of the catalyst under consideration of the reaction temperature, the process conditions and the residence time distribution.

Preferably, as regards process conditions, adjustment of the average residence time is done by either adapting the solvent feed rate, and/or the catalyst feed rate and/or the reactor volume.

In an embodiment of the invention, the residence time of the catalyst in the reactor is further optimized, which means that, on the one hand, the residence time is adjusted so as to be long enough in order to ensure that in the reactor outlet stream leaving the reactor the catalyst is already sufficiently de-activated.

On the other hand, as a too long residence time might result in a large quantity of already de-activated catalyst in the reactor which has negative consequences on process economics, the present invention also allows for adjusting the residence time to be as short as possible to affect process economics as little as possible.

To optimize the catalyst residence time, the following mathematical equations may be utilized. After a time t, the concentration of active catalyst inside the reactor can be described by the following empirical equation (1):

$$C^*_{cat} = C^*_{cat,0} e^{-k_d t} \quad (1)$$

wherein $C^*_{cat}$ is the concentration of active catalyst, $C^*_{cat,0}$ is the initial active catalyst concentration, $k_d$ is the kinetic rate constant of the de-activation reaction and t is time.

The catalyst de-activation constant $k_d$, can be modelled as temperature dependent through Arrhenius equation seen in equation (2):

$$k_d = k_{d,0} e^{\frac{E_{a,d}}{RT}} \quad (2)$$

wherein $E_{a,d}$ is the activation energy constant, R is the ideal gas constant and T is the temperature.

To describe the residence time distribution (RTD) the particulars of the reactor setup have to be considered, as is well known to the skilled person.

As an example and in a preferred embodiment of the invention, a real reactor may be approximated by two continuously stirred tank reactors connected by a plug-flow reactor.

The RTD function, X(t), for such configuration is described by Equation 3:

$$X(t) = \left(1 - e^{\frac{-t}{t_1}}\right)\left(1 - e^{\frac{-t-t_3}{t_2}}\right) \cdot 100 \quad (3)$$

wherein t is time in minutes, $t_1$ is the residence time in the first part of the reactor, $t_2$ is the residence time second part of the reactor and $t_3$ is the dead time between the sections.

Preferably, the average residence time in the reactor in step b) during which the feed of step a) is contacted in the reactor with a catalyst to form a reaction mixture containing an ethylene-alpha-olefin co-polymer, is chosen to be between 0.5 and 15 minutes, more preferably between 1 and 15 minutes.

A calculation according to the above equations leads to a preferred embodiment of the process of the invention wherein the average residence time $t_{average}$ in the reactor is complying with the relation:

$$2900/T_{reactor} - 13 < t_{average} < 4200/T_{reactor} - 13,$$

preferably with the relation:

$$3000/T_{reactor} - 13 < t_{average} < 3500/T_{reactor} - 13$$

wherein $T_{reactor}$ is the temperature in the polymerization reactor, and wherein the reactor is approximated by two continuously stirred tank reactors connected by a plug-flow reactor.

Preferably, in the process of the invention no more than 4 wt. % of catalyst in an active state, more preferably no more than 3 wt. % of catalyst in an active state, is leaving the reactor in step c).

These even smaller amounts of active catalyst leaving the reactor in step c) may, for example, be obtained by increasing the average residence time in step b).

It is highly preferred that the process of the invention is a continuous process.

Usually and in a preferred embodiment of the invention the reactor outlet stream is fed to a low pressure separator in order to effect the separation of the hydrocarbon solvent from the remainder of the reactor outlet stream in step d).

In the process of the invention, the catalyst is sufficiently de-activated in the reactor outlet stream, so that, for example, no catalyst de-activation agent needs to be added to the reactor outlet stream before the separation of the in step d). In this manner, disadvantages of a carrying over of such agents to the reactor with recycled monomers as described above can be avoided.

It is, accordingly, preferred in the present invention that no catalyst de-activation agent is added to the reactor outlet before feeding the outlet to the separation of step d).

By the same token, there is also no need to supply heat to the reactor outlet stream in order to deactivate the catalyst.

Further preferred, the reactor outlet stream between leaving the reactor and entering the separation step d) is not subjected to any further treatment steps such as separation of components from the stream or addition of further components.

The process of the present invention is a process for the production an ethylene co-polymer by polymerization of ethylene and (a) co-monomer(s) in solution. In such solution polymerisation processes, the monomers are polymerized at a temperature in which the polymer is dissolved in the solvent mixture, which is present in the reactor.

At least one co-monomer is an α-olefin having from 3 to 12 carbon atoms and mixtures thereof, preferably 4 to 10 carbon atoms, most preferably 1-octene.

Preferably, the co-monomer is selected from the group consisting of linear olefins.

Typically, the solution polymerization process is a high temperature solution polymerization process, using a polymerization temperature of greater than 100° C.

Preferably, the polymerization temperature is at least 110° C., more preferably at least 140° C.

The temperature in the polymerization reactor(s) is such that the polymer formed in the reactor is completely dissolved in the reaction mixture comprising the solvent, the monomer and co-monomer(s), the chain transfer agent and the polymer.

The co-monomer to monomer feed ratio of the process of the present invention is preferably between 0.0 and 1.8, more preferably between 0.05 and 1.7, and most preferably between 0.10 and 1.65.

The temperature is suitably greater than the melting temperature of the polymer. Thus, as the polymer is co-polymer of ethylene the temperature is suitably from 120 to 220° C., such as from 140 to 210° C. or from 150 to 200° C., depending on the content of co-monomer units in the polymer and on the catalyst in use.

The pressure in the solution polymerization reactor depends on the one hand, on the reaction temperature and, on the other hand, on the type and amount of comonomer. The pressure is suitably in a range of from 50 to 300 bar, preferably from 50 to 250 bar and more preferably from 70 to 200 bar.

The pressure of the reactor outlet usually corresponds to the pressure in the reactor.

The polymerization is conducted in the presence of an olefin polymerization catalyst.

Preferably, the process of the invention is a homogenously catalysed process.

Furthermore, the catalyst preferably is a metallocene catalyst, more preferably is a catalyst comprises a hafnocene catalyst, and still more preferably comprises a hafnocene catalyst complex, comprising a cyclopentadienyl (Cp) ligand, a fluorenyl (Flu) ligand and a covalent bridge connecting the two ligands.

When the catalyst comprises a hafnocene complex, preferably a boron based co-catalyst and/or an aluminoxane co-catalyst is used.

Most preferably, the polymerization is conducted in the presence of an olefin polymerization catalyst as described in any of WO 2018/178151, WO 2018/178152, WO 2018/108917, and WO 2018/108918.

The catalyst preferably has productivity between 100 and 2,500 kg/g, more preferably between 200 and 2,250 kg/g, and most preferably between 300 and 2,000 kg/g.

In solution polymerization process a solvent is also present. The solvent is in liquid or supercritical state in the polymerization conditions. The solvent is typically and preferably a saturated hydrocarbon solvent. The liquid hydrocarbon solvent used is preferably a saturated $C_{5-12}$-hydrocarbon, which may be unsubstituted or substituted by $C_{1-4}$ alkyl group such as pentane, methyl pentane, hexane, heptane, octane, cyclohexane, methylcyclohexane and hydrogenated naphtha. More preferably, saturated unsubstituted $C_{6-10}$-hydrocarbon solvents are used.

Typically the content of the polymer in the solution comprising the solvent, the polymer and the unreacted monomer and co-monomer, i.e. the polymer mass fraction, is from 5 to 50% by weight, preferably from 10 to 40% by weight, more preferably from 10 to 35% by weight, such as from 10 to 30% by weight.

In addition, other components may be added into the reactor. It is known to feed hydrogen into the reactor for controlling the molecular weight of the polymer formed during the polymerization. The use of different antifouling compounds is also known in the art. In addition, different kinds of activity boosters or activity retarders may be used for controlling the activity of the catalyst.

The process includes one or more polymerization reactors. Suitable reactors include unstirred or stirred, spherical, cylindrical and tank-like vessels and recirculating loop reactors and tubular reactors. Such reactors typically include feeding points for monomer, optional co-monomer, solvent, catalyst and optional other reactants and additives and withdrawal points for reaction mixture, i.e. polymer solutions. In addition, the reactors may include heating or cooling means.

The ethylene co-polymer produced in the process of the present invention preferably has a density of between 850 and 960 kg/m³, more preferably 855 and 940 kg/m³ and most preferably 857 and 930 kg/m³.

As mentioned above, in a preferred embodiment the reactor outlet stream is fed to a low pressure separator, in which volatile hydrocarbons, including solvent, and unreacted monomer and comonomer, are removed from the polymer solution.

Low pressure separators are known in the art. Frequently, they are also referred to as flash separators or flash vessels. Such a flash vessel preferably has a generally cylindrical shape. Thereby, the flash vessel has a section which has approximately a circular cross-section. Preferably, the flash vessel has a cylindrical section which has a shape of a circular cylinder. In addition to the cylindrical section the flash vessel may have additional sections, such as a bottom section, which may be conical, and a top section which may be hemispherical. Alternatively, the flash vessel may also have a generally conical shape.

The liquid feed is passed to the separator which is operated at a reduced pressure. Thereby, a part of the liquid phase vaporizes and can be withdrawn as an overhead stream (or a vapour stream) from the low pressure separator. The part remaining in liquid phase is then withdrawn as a bottom or liquid stream.

The temperature in the separator is typically from 130 to 300° C., more preferably from 140 to 280° C., still more preferably from 150 to 270° C., and most preferably from 160 to 250° C. The temperature should be sufficiently high to keep the viscosity of the solution at a suitable level but less than the temperature where the polymer is degraded.

The pressure in the separator is typically less than 20 bar, more preferably less than 15 bar, more preferably such as less than 12 bar, or even less than 10 bar. The pressure in the separator may be down to even less than atmospheric pressure, such as 0.5 bar, or the pressure may be 1 bar or more.

The process of the invention may comprise more than one low pressure separation steps each conducted separately in a low pressure separator.

In the following the present invention will be illustrated by examples and by referring to the following figures which show:

FIG. 1: Catalyst 1 fraction of material including active catalyst leaving the reactor at different temperatures, average residence time: 10 min., FIG. 2: Catalyst 2 fraction of material including active catalyst leaving the reactor at different temperatures, average residence time: 10 min., FIG. 3: Catalyst 1 fraction of material including active catalyst leaving the reactor at different temperatures, average residence time: 8 min., FIG. 4: Catalyst 2 fraction of material including active catalyst leaving the reactor at different temperatures, average residence time: 8 min.

Figure 5:
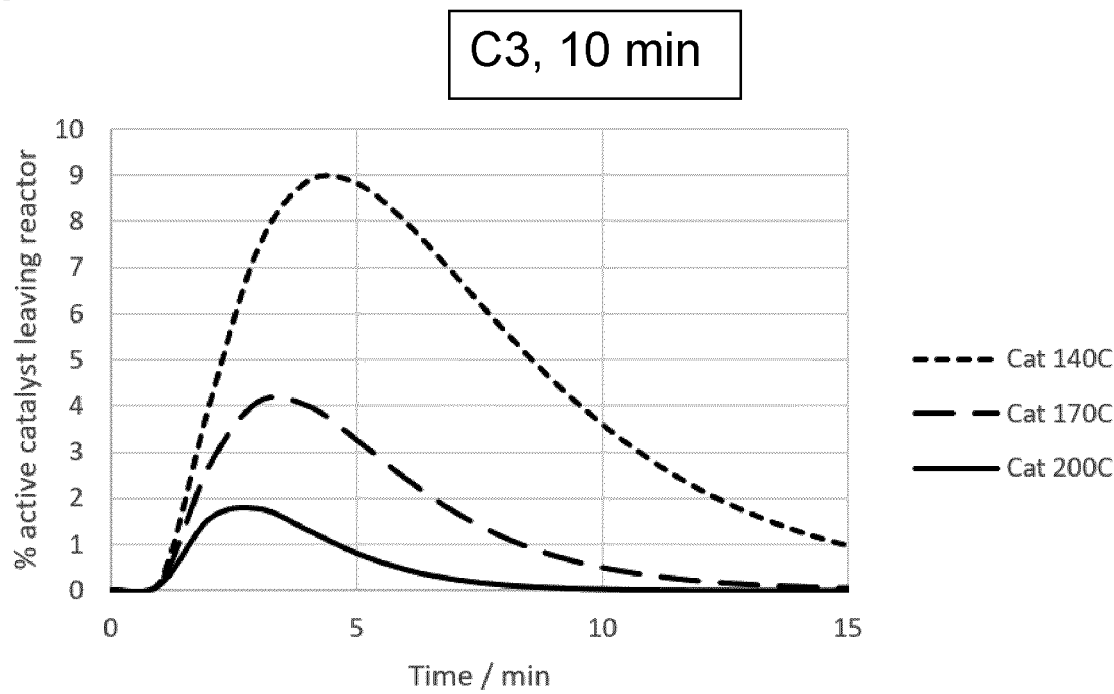

FIG. 5: Catalyst 3 fraction of material including active catalyst leaving the reactor at different temperatures, average residence time: 10 min., FIG. 6: Catalyst 3 fraction of material including active catalyst leaving the reactor at different temperatures, average residence time: 8 min.

MEASUREMENT AND DETERMINATION METHODS

Melt Flow Rate and Flow Rate Ratio

The melt flow rate (MFR) is determined according to ISO 1133 and is indicated in g/10 min. The MFR is determined at 190° C. for polyethylene and at a loading of 2.16 kg ($MFR_2$), 5.00 kg ($MFR_5$), 10.00 kg ($MFR_{10}$) or 21.6 kg ($MFR_{21}$).

The quantity FRR (flow rate ratio) is an indication of molecular weight distribution and denotes the ratio of flow rates at different loadings. Thus, for example, $FRR_{21/10}$ denotes the value of $MFR_{21}/MFR_{10}$.

Density

Density of the polymer is measured according to ISO 1183-1 method A using compression moulded samples. It is indicated in kg/m³.

Average Residence Time and Amount of Active Catalyst Leaving Reactor

The average residence time and the amount of catalyst leaving the reactor in an active state is determined by modelling of the reaction as can routinely be done by the skilled person.

Catalyst Productivity

The productivity of the catalyst was determined as the amount of polymer produced divided by the amount of metal in the catalyst (in g-PO/mg-Hf).

EXAMPLES

In the following examples, equations (1), (2) and (3) for three different catalysts (catalyst 1, 2 and 3) were used in order to calculate the catalyst de-activation profile and the amount of active catalyst leaving the reactor with the reactor outlet.

The parameters used in the equations were:

Catalyst 1:
  $C^*_{cat,0}=1$ mol/m³
  $k_{d,0}=19.3$ mol⁻¹s⁻¹
  $E_a=26 \cdot 10^{-3}$ J/mol
  $t_1=0.18 \cdot t_{total}$
  $t_2=0.74 \cdot t_{total}$
  $t_3=0.08 \cdot t_{total}$ Catalyst 2:
  $C^*_{cat,0}=1$ mol/m³
  $k_{d,0}=26.7$ mol⁻¹s⁻¹
  $E_a=27 \cdot 10^{-3}$ J/mol
  $t_1=0.18 \cdot t_{total}$
  $t_2=0.74 \cdot t_{total}$
  $t_3=0.08 \cdot$ total Catalyst 3:
  $C^*_{cat,0}=1$ mol/m³
  $k_{d,0}=9.7$ mol⁻¹s⁻¹
  $E_a=26 \cdot 10^{-3}$ J/mol
  $t_1=0.18 \cdot t_{total}$
  $t_2=0.74 \cdot t_{total}$
  $t_3=0.08 \cdot t_{total}$ The results of the calculations are shown in FIGS. 1 to 6, where the fraction of material leaving the reactor based on the residence time distribution is shown as a function of time.

The catalyst deactivation constant is calculated for different temperatures (140, 170 and 200° C.) with equation (2) and the deactivation as a function of time with equation (1). The fraction of material, fed to the reactor at time t, leaving the reactor at time t+dt is calculated with equation (3). The calculations are done for two different average residence times: 8 and 10 minutes.

Figure 2:
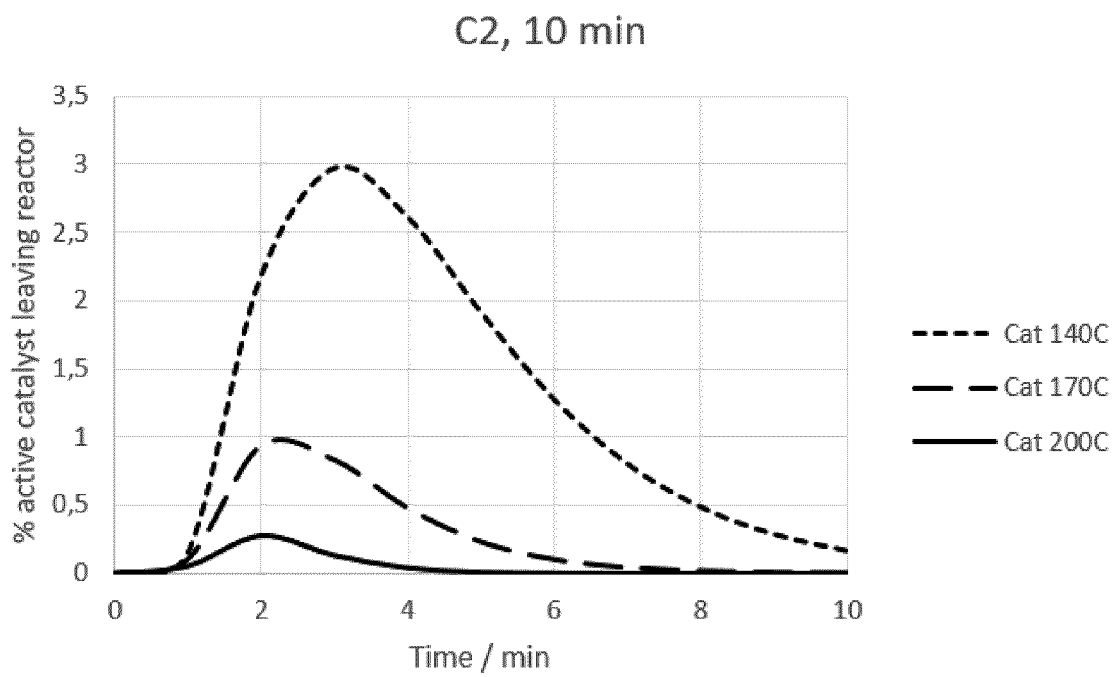
Figure 3:
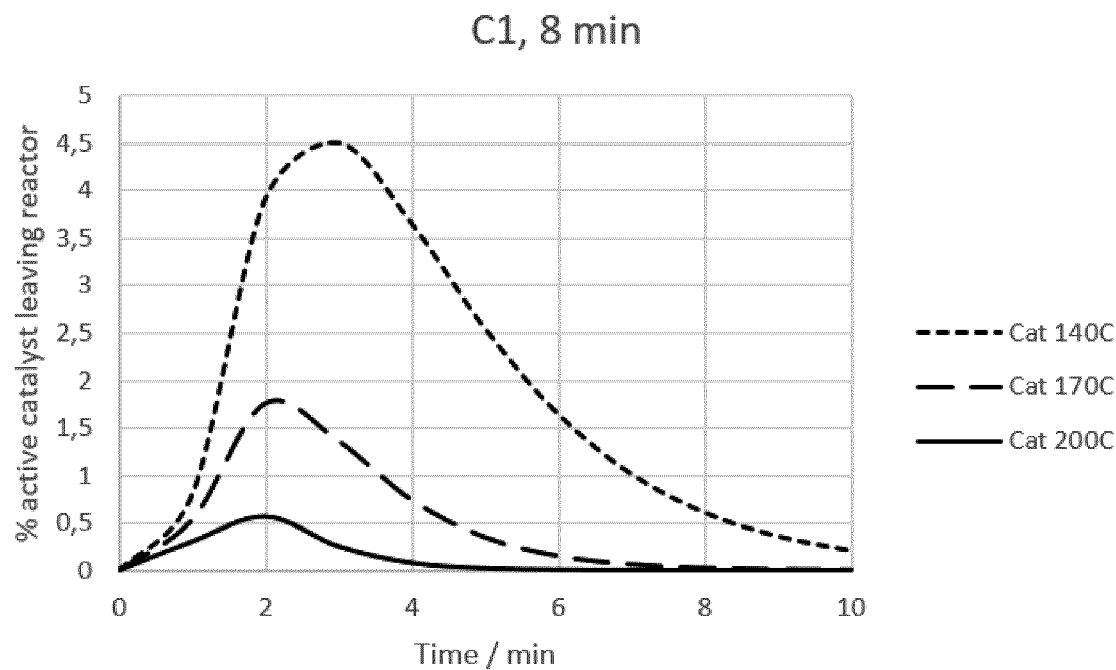
Figure 4:
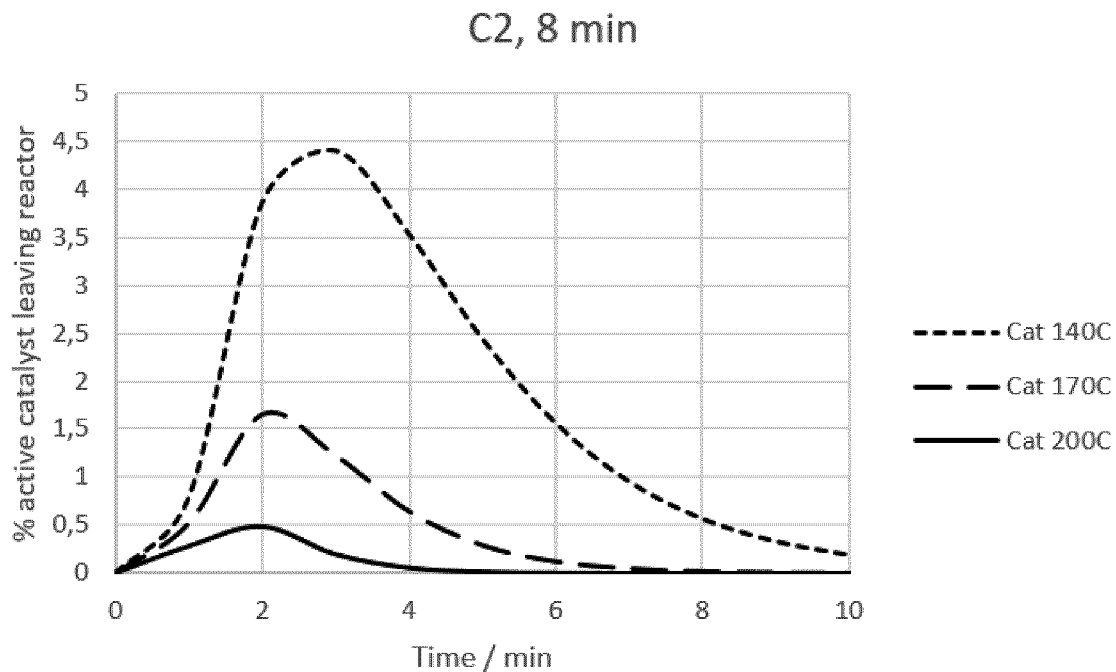

FIG. 1 and FIG. 3 represent the first catalyst (catalyst 1) with residence times of 10 and 8 minutes, respectively. FIGS. 2 and 4 represent the second catalyst (catalyst 2) with the residence times of 10 and 8 minutes, respectively.

Looking at FIGS. 1 and 2, the fraction of active catalyst leaving for both catalysts is less than approx. 3 wt. % during all times and temperatures. This indicates that the residence time is long enough in terms of controlling the catalyst activity in the outlet stream to the desired value and well below 5 wt. %.

Looking at FIGS. 3 and 4 it is seen that the fraction of active catalyst for both catalysts leaving the reactor is less than 5 wt. % for all temperatures 140° C., 170° C. and 200° C. during all times. However, for 140° C. the amount of active catalyst leaving the reactor is about 4.5 wt. % at around 3 minutes. This shows that the residence time of 8 minutes might not be sufficient to ensure having low enough, <4 wt %, concentration of active catalyst leaving the reactor at 140° C.

Figure 6:
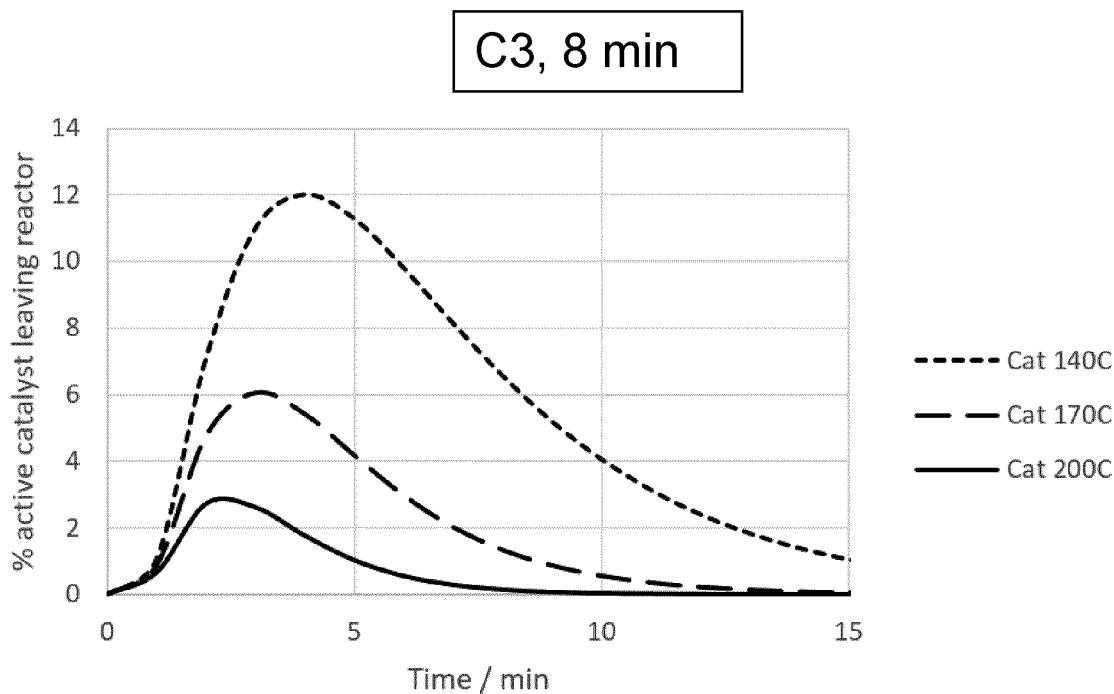

Finally, FIGS. 5 and 6 shows that for catalyst 3, which has a $k_{d,0}$ which is half of that of catalyst 1, a higher temperature will have to be applied so that at the chosen residence times of 10 min. and 8 min. the catalyst activity in the outlet stream can be controlled to the desired value and well below 5 wt. %.

The invention claimed is:

1. A polymerisation process, comprising:
    a) supplying a feed containing ethylene and at least one alpha-olefin having 3 to 12 carbon atoms in a hydrocarbon solvent to a polymerization reactor,
    b) contacting the feed of step a) in the polymerization reactor with a catalyst to form a reaction mixture containing an ethylene-alpha-olefin co-polymer, whereby an average residence time in the polymerization reactor is chosen to be between 0.5 and 30 minutes,
    c) withdrawing the reaction mixture from the polymerization reactor as a reactor outlet stream which comprises the ethylene-alpha-olefin co-polymer, unreacted monomer and comonomer, catalyst, and hydrocarbon solvent, and
    d) separating hydrocarbon solvent, monomer and comonomer from the reactor outlet stream and recycling it back to the polymerization reactor without further purification steps,
    wherein in step c) no more than 5 wt % of catalyst in an active state is leaving the polymerization reactor.

2. The process according to claim 1 wherein in step c) no more than 3 wt % of catalyst in an active state is leaving the polymerization reactor.

3. The process according to claim 1 wherein a chosen average residence time is adjusted by either adjusting the solvent feed rate, and/or the catalyst feed rate.

4. The process according to claim 1 wherein the average residence time $t_{average}$ in the polymerization reactor complies with the relation:

$$2900/T_{reactor}-13 < t_{average} < 4200/T_{reactor}-13,$$

wherein $T_{reactor}$ is temperature in the polymerization reactor.

5. The process according to claim 1 wherein in step c) no more than 4 wt % of catalyst in an active state is leaving the polymerization reactor.

6. The process according to claim 1 wherein the process is a continuous process.

7. The process according to claim 1 wherein separating hydrocarbon solvent from the reactor outlet stream in step d) is done by feeding the reactor outlet stream to a low pressure separator.

8. The process according to claim 1 wherein no catalyst de-activation agent is added to the reactor outlet stream before entering the low pressure separator.

9. The process according to claim 1 wherein the polymerization catalyst comprises a metallocene catalyst and a boron containing cocatalyst and/or an aluminoxane co-catalyst.

10. The process according to claim 9 wherein the metallocene catalyst comprises a hafnocene catalyst.

11. The process according to claim 10 wherein the hafnocene catalyst comprises a hafnocene complex, comprising a cyclopentadienyl (Cp) ligand, a fluorenyl (Flu) ligand and a covalent bridge connecting the two ligands.

12. The process according to claim 1, wherein a polymerization reaction is performed at a temperature of between 120 to 220° C.

13. The process according to claim 1, wherein a polymerization reaction is performed at a pressure of between 50 to 300 bar.

14. The process according claim 1, wherein polymer mass fraction inside the polymerization reactor is between 5.0 wt % to 50.0 wt %.

* * * * *